No. 670,181. Patented Mar. 19, 1901.
E. MANULA.
CAN SOLDERING MACHINE FEED DEVICE.
(Application filed Oct. 24, 1900.)
(No Model.)
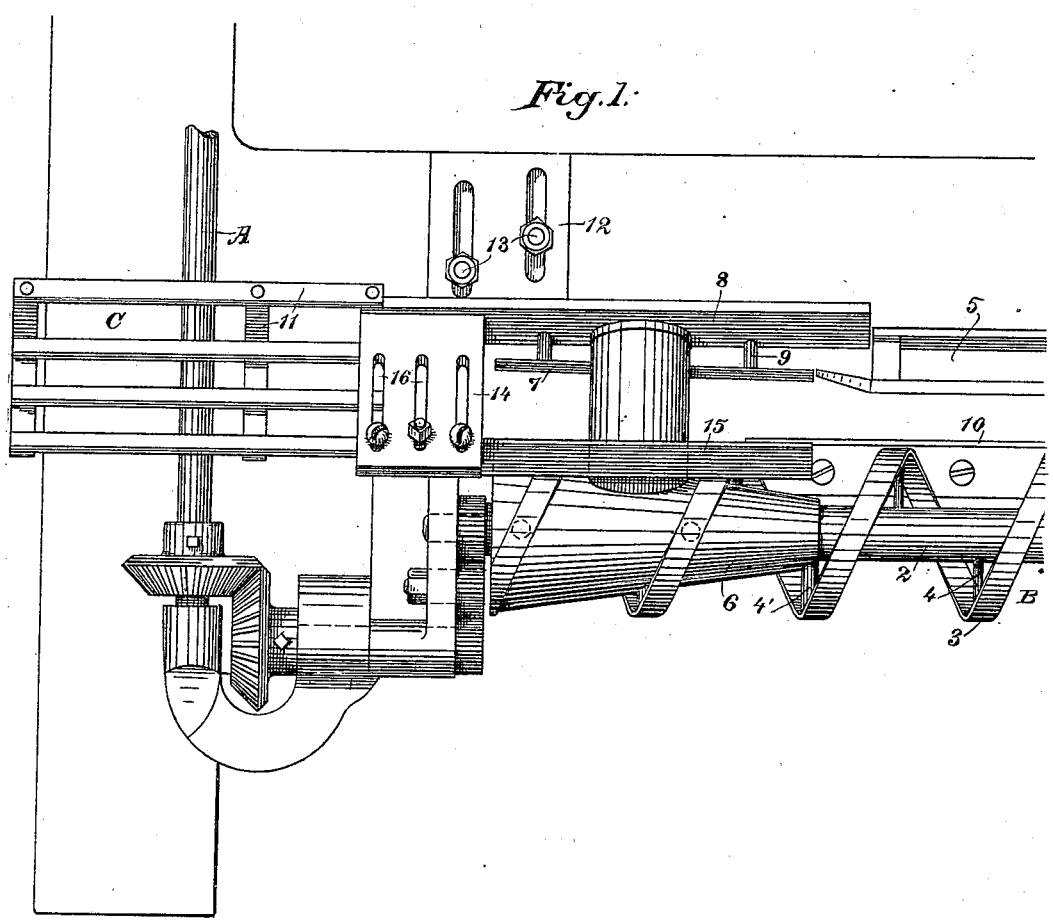
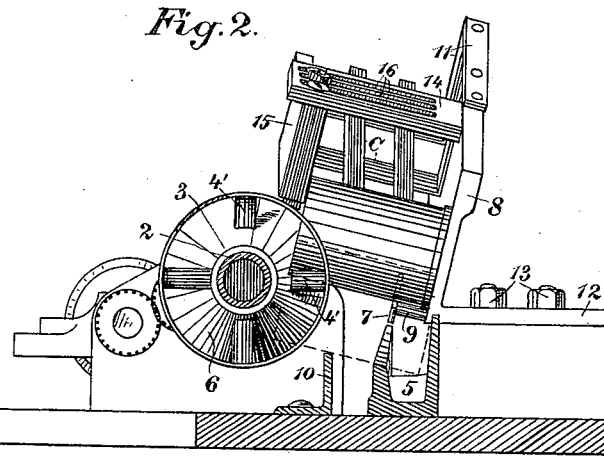

UNITED STATES PATENT OFFICE.

ERIK MANULA, OF ASTORIA, OREGON.

CAN-SOLDERING-MACHINE FEED DEVICE.

SPECIFICATION forming part of Letters Patent No. 670,181, dated March 19, 1901.

Application filed October 24, 1900. Serial No. 34,154. (No model.)

*To all whom it may concern:*

Be it known that I, ERIK MANULA, a citizen of the United States, residing at Astoria, county of Clatsop, State of Oregon, have invented an Improvement in Can-Soldering-Machine Feed Devices; and I hereby declare the following to be a full, clear, and exact description of the same.

My invention relates to improvements in feed devices for spirally feeding cans in can-soldering machines.

It consists of a revoluble inclined support or cone upon the feed end of a spiral driver, of guiding devices, and of details more fully to be set forth in the following specification and accompanying drawings, in which—

Figure 1 is a plan view of the machine. Fig. 2 is a lateral section taken on a line through the soldering-trough.

My invention is intended particularly for the type of machine in which cans are carried by a driver, by which driver the can is made continually to revolve and to have its edges dip successively into an acid or solder bath.

Only so much of a machine is shown as to illustrate the position and operation of the feeder.

A represents a power-shaft imparting motion to the spiral driver B. This driver is made with an axle 2, having the coil 3 supported upon arms 4.

As it is customary to dip cans in acid before soldering, the acid-trough would here be illustrated, as by 5.

As it is to the means by which the cans are led into the trough 5 that my invention relates, the further progression of the can through the machine need not be detailed.

Secured upon the end of the axle 2 is the frustum of a cone 6, having its taper in the direction of the extension of the spiral driver. The spiral incloses this cone and is supported therefrom by arms 4'. As the spiral is of the same radius throughout its length, these arms 4' are of gradually-reduced length from the smaller to the larger end of the cone, as shown.

Cans are usually designated as "tall" or "short." A tall can is represented in the machine. Entering by the chute C, one end of the can rests on the cone 6 and the other on the strip 7, which is secured to and held away from a guide-wall 8 by rivet-braces 9. The strip 7 is so tapered or secured to 8 as to incline the can at the same angle with relation to the cone 6 throughout this portion of the travel. When the can advances to the ends of these two supports, it passes onto the inwardly-projecting edge of the acid-trough and onto the guide 10, which latter is removably secured to the base of the machine and so made in relation to the edge of the trough as to maintain the can at the proper dipping-angle.

The wall 11 of the chute C is practically a continuation of the guide-wall 8, and the parts are so joined as to be movable in unison with a base-plate 12, of which the wall 8 is a part. Their inclination to this base is such as to give the can upon the chute the same inclination or dip that it is to have after it enters the machine. The plate 12 is slotted and secured to the bed of the machine by set-screws 13, so that this portion of the feeder may be moved to or from the spiral.

That the cans may be directed properly into the spiral and always with their longitudinal axis at right angles to the axis of the spiral I provide a plate 14, having a guide 15, upon the upper edge of 8 at the end of the chute. The height of the wall 8 permits cans to pass beneath the plate 14. The guide 15 is upon the under side of 14 and is slidable in slots 16, so that cans of all lengths may be accommodated and properly directed between the wall 8 and the guide 15. 15 extends just above the spiral and a length equal to the cone 6.

By my device it is impossible for more than one can to enter the machine at a time, because when the can passes from the chute C and onto the cone 6 the projection of the spiral above the cone retards the progress of the can, as the incline of the chute allows the can to acquire but slight headway, and as the projection of the spiral is so slight there is no jamming of the can, which is of the greatest importance. In the case of two cans entering the chute the spiral will retard and regulate the first can, and the second can will be duly separated from the first in the course of the revolution of the cone and spiral.

When short cans are to be run through the machine, the guide or supporting bar 10 is removed, and the plate 12, with its parts 8 and C, is moved in, so that the spiral may act on the can. This can does not touch the cone, but is guided between 8 and 15 and is supported upon 7 and against 8 and held at the proper angle.

Having thus described my invention, what I claim as new, and desire to secure by Letters Patent, is—

1. In a can-soldering machine, a feed device having a frustum of a cone upon one end of the axle of a spiral driver, said cone tapering in the direction of the other end of the spiral, and guides similarly inclined in relation to the cone and upon which guides and the cone cans are adapted to rest and be directed into the machine.

2. In a can-soldering machine, a feed device consisting of a frustum of a cone upon one end of the axle of a spiral driver, said cone tapering toward the other end of the driver and inclosed within and supporting the spiral, an angle-plate attached to the bed of the machine and having on its upward extension a guide or ledge, said angle-plate so arranged in relation to the cone that a can will have one end resting upon the cone, and the other and lower end against the upward extension and upon the ledge, whereby the can is guided and given the inclination that it is to maintain after entering the acid or solder baths, and means for introducing the can upon the above-mentioned supports.

3. In a can-soldering machine, a feed device consisting of a cone upon one end of the axle of a spiral driver, and inclosed within the spiral, said cone having its apex in the direction of travel of the spiral, a support arranged parallel to the axis of the spiral and having its upper edge so inclined that a can resting with its lower end upon this support and its other end upon the cone, will retain the same dip while traveling upon the support and cone, said support attached to a guide-wall which is movably secured to the bed of the machine, and against which wall the lower end of the cans rest, a guide attached to this wall and adapted to keep the cans always with their axes at right angles to the axis of the cone, and means for introducing the cans upon these supports.

4. The combination in a soldering-machine having a spiral driver with an axle upon which the spiral is supported, and an acid or solder trough arranged in relation to the driver of a feed device consisting of a cone upon the outer end of the axle of the spiral and having upon it projecting lugs by which the spiral is supported, and the base of said cone of slightly less diameter than the interior diameter of the spiral, a guide or wall parallel to the axis of the spiral and abutting against the acid-trough, said wall having upon it a strip or ledge whose upper edge inclines similarly to the taper of the cone, this guide wall and strip intended to support the lower end of a can whose other end rests on the cone, a plate upon the upper edge of this wall to which is secured a downwardly-projecting guide, which latter is arranged above the spiral and its length approximately that of the cone, said guide intended to keep the cans in proper alinement and prevent jamming in entering the machine and adjustable to varying lengths of cans, an incline or feed-chute having its outer perpendicular wall in alinement, and continuous with the aforesaid guide-wall, and its bottom in practically the same plane with the plane of travel of the can upon the cone and guide-strip, and said chute and guide-wall with its parts being movable in unison upon the bed of the machine to or from the spiral.

In witness whereof I have hereunto set my hand.

ERIK MANULA.

Witnesses:
E. G. ROGERS,
BURR OSBURN.